US006289581B1

(12) United States Patent
Pote

(10) Patent No.: US 6,289,581 B1
(45) Date of Patent: Sep. 18, 2001

(54) METHOD OF MAKING FLEXIBLE COAXIAL CABLE HAVING LOCKED COMPRESSIBLE DIELECTRIC

(75) Inventor: William T. Pote, Hackettstown, NJ (US)

(73) Assignee: Flexco Microwave, Inc., Hackettstown, NJ (US)

(*) Notice: Subject to any disclaimer, the term of this patent is extended or adjusted under 35 U.S.C. 154(b) by 0 days.

(21) Appl. No.: 09/332,470

(22) Filed: Jun. 14, 1999

(51) Int. Cl.[7] .......... A01B 13/20

(52) U.S. Cl. .......... 29/828; 29/825; 174/107; 174/110 R; 264/49.5

(58) Field of Search .......... 29/825, 828; 174/107, 174/110 R; 264/45.9

(56) References Cited

U.S. PATENT DOCUMENTS

| | | | | |
|---|---|---|---|---|
| 3,553,811 | * | 1/1971 | Garner | 29/828 |
| 3,569,610 | * | 3/1971 | Garner et al. | 29/828 |
| 3,703,034 | * | 11/1972 | Eilhardt et al. | 29/828 |
| 3,710,440 | * | 1/1973 | Nevin et al. | 29/828 |
| 4,304,713 | * | 12/1981 | Perelman | 29/828 |
| 4,560,829 | * | 12/1985 | Reed et al. | 29/828 |

* cited by examiner

*Primary Examiner*—Carl J. Arbes
(74) *Attorney, Agent, or Firm*—Lawrence G. Kurland, Esq.; Bryan Cave LLP

(57) ABSTRACT

A method of making a flexible coaxial cable comprises the steps of providing a resiliently compressible dielectric core having an inner conductor, such as a core comprised of wrapped expanded Teflon tape or a compressible foam material having memory, which is compressed and drawn through a flexible hollow outer conductive sheath comprising a corrugated portion having a plurality of peaks and valleys of predetermined pitch. The innermost circumference of the sheath is less than the outermost extent of the dielectric core so that when the compressed core has been drawn through the sheath, it expands to lock the core to the sheath. An air pressure against the convolutions of the sheath to prevent elongation of the pitch when the oversized compressed core is pulled through.

12 Claims, 1 Drawing Sheet

METHOD OF MAKING FLEXIBLE COAXIAL CABLE HAVING LOCKED COMPRESSIBLE DIELECTRIC

BACKGROUND OF THE INVENTION

1. Technical Field of the Invention

The present invention relates to improvements in the methods of making flexible coaxial cables.

2. Background Art

Coaxial cables, such as for microwave transmission, have existed in the prior art for a considerable period of time. As technology has developed, a need for flexible coaxial cables whose electrical characteristics do not vary during flexure of the cable, such as in aerospace utilization, has developed. In such utilization's, often the electrical characteristics of the cable are critical and any variation therein will yield unsatisfactory transmissions via such cables. In order to increase the flexibility of prior art coaxial cables, corrugated outer conductors, such as disclosed in U.S. Pat. Nos. 3,582,536; 3,173,990 and 2,890,263 have been utilized. In addition, other prior art attempts of providing such flexibility have employed a corrugated outer sheath for the cable rather than a corrugated outer conductor, such as disclosed in U.S. Pat. No. 3,002,047. Furthermore, this concept of a corrugated outer sheath has been utilized for standard electrical cables, as opposed to coaxial cables, where such cables are exposed to considerable flexure, such as disclosed in U.S. Pat. Nos. 2,348,641 and 2,995,616.

In order to ensure electrical stability for a coaxial cable, the relative location between the various portions of the outer conductor, the dielectric and the inner conductor must remain constant during flexure of the cable or the electrical characteristics may vary. Prior art attempts to ensure this stability have involved the locking of a corrugated outer conductor to the dielectric surrounding the inner conductor, such as disclosed in U.S. Pat. No. 3,173,990 wherein such inner conductor is a foam polyethylene. However, such prior art flexible coaxial cables do not have sufficient flexibility nor do they have sufficient temperature stability, which also affects the electrical characteristics. These prior art coaxial cables utilize either a tube which is crimped to provide a corrugated tube or form the outer conductor by means of helically winding a piece of conductive material, welding the adjacent pieces together to then form a tube and, thereafter, crimping alternate longitudinal portions so as to provide a corrugated tube. In both instances, the maximum pitch for the convolutions of the outer conductor is severely limited. In the first instance, this limitation is primarily due to rupture of the conductive tube if the crimps are too closely spaced together whereas, in the second instance, the limitations are primarily due to the inability to sufficiently control the thickness of the resultant tube which is formed as a thin enough material cannot be utilized to produce a high pitch. Since the higher the pitch of the convoluted outer conductor, the greater the flexibility of the coaxial cable, these prior art flexible coaxial cables have not been satisfactory where large degrees of flexure are required together with electrical and temperature stability over a wide range of flexure.

These disadvantages of the prior art have been overcome to an extent by the prior invention of U.S. Pat. No. 3,797,104 employing a solid dielectric. However, the ability to provide flexible coaxial cables for certain applications in which a particular velocity of propagation or lower attenuation was required was somewhat limited as was the ability to readily change the velocity of propagation of the flexible coaxial cable to the desired value during manufacture. Moreover, although there have been prior art attempts to use helically wound dielectrics for coaxial cable, such as disclosed in U.S. Pat. No. 4,346,253; French Patent No. 752,006 and British Patent No. 616,303, they have not been satisfactorily employed for flexible coaxial cables, particularly since any change in pitch of the helically would dielectric during flexing of the cable wound undesirably change the properties of the cable. These disadvantages of the prior art have been overcome to some extent by the prior invention of U.S. Pat. No. 4,758,685 employing a heat shrinkable dielectric tubing surrounding a helically would dielectric beading. However, the process of manufacturing such a flexible coaxial cable is difficult and necessarily can lend itself to instabilities, such as if the shrinking were non-uniform thereby resulting in a non-uniform dielectric core which could cause problems in inserting the core into the outer conductor, and resultant electrical instability due to the locking of a non-uniform core. Moreover, in locking the outer conductor to the dielectric core when forming a high frequency cable, whether using the arrangement disclosed in U.S. Pat. Nos. 3,797,104 or 4,758,685, if any deformation of the convolutions occurs during locking moding can result at the high frequencies transmitted over the resultant cable. Such moding is undesirable in that it eases deterioration in the transmission of the RF signal over the cable due to the high VSWR and attenuation which result. Other attempts to overcome the disadvantages of the prior art are disclosed in applicant's U.S. Pat. Nos. 5,181,316; 5,196,078; and 5,239,134. However, although these approaches have been successful, they are still insufficient in certain important applications such as for coaxial cable assemblies used in phase array radar systems and test equipment where the phase performance of the cable becomes even more critical. These disadvantages of the prior art are overcome by the present invention which provides a method in which the outer conductor may be readily locked to the dielectric core without any potential deformation of the convolutions and with significant enhancement in phase performance.

DISCLOSURE OF THE INVENTION

A method of making a flexible coaxial cable comprises the steps of providing a resiliently comprehensible core comprising an inner conductor and a resiliently compressible dielectric surrounding the inner conductor. The inner conductor is located substantially along the longitudinal axis of the resiliently compressible dielectric which has a normal expanded outermost radial extent about the longitudinal axis. A flexible convoluted hollow outer conductive sheath, having a corrugated portion, is provided which has a longitudinal axis coextensive with the dielectric core longitudinal axis and an innermost radial extent about the longitudinal axis which defines an innermost circumference of the sheath which is smaller than the expanded outermost radial extent of the hollow sheath. The corrugated portion of the sheath comprises a plurality of peaks and valleys having a predetermined pitch. The dielectric core is compressed and inserted into the hollow sheath as it is drawn through while the elongation of the pitch of the sheath is maintained by air pressure, such as from an air bladder which surrounds the sheath. When the compressed core resides in the hollow sheath, it expands back to its original diameter and locks itself to the flexible sheath. This locked arrangement has been demonstrated to have significantly improved phase performance in the microwave band, such as at 26.5 GHz.

BEST MODE FOR CARRYING OUT THE INVENTION

Figures 1, 2, 3, 4, 5, 6:
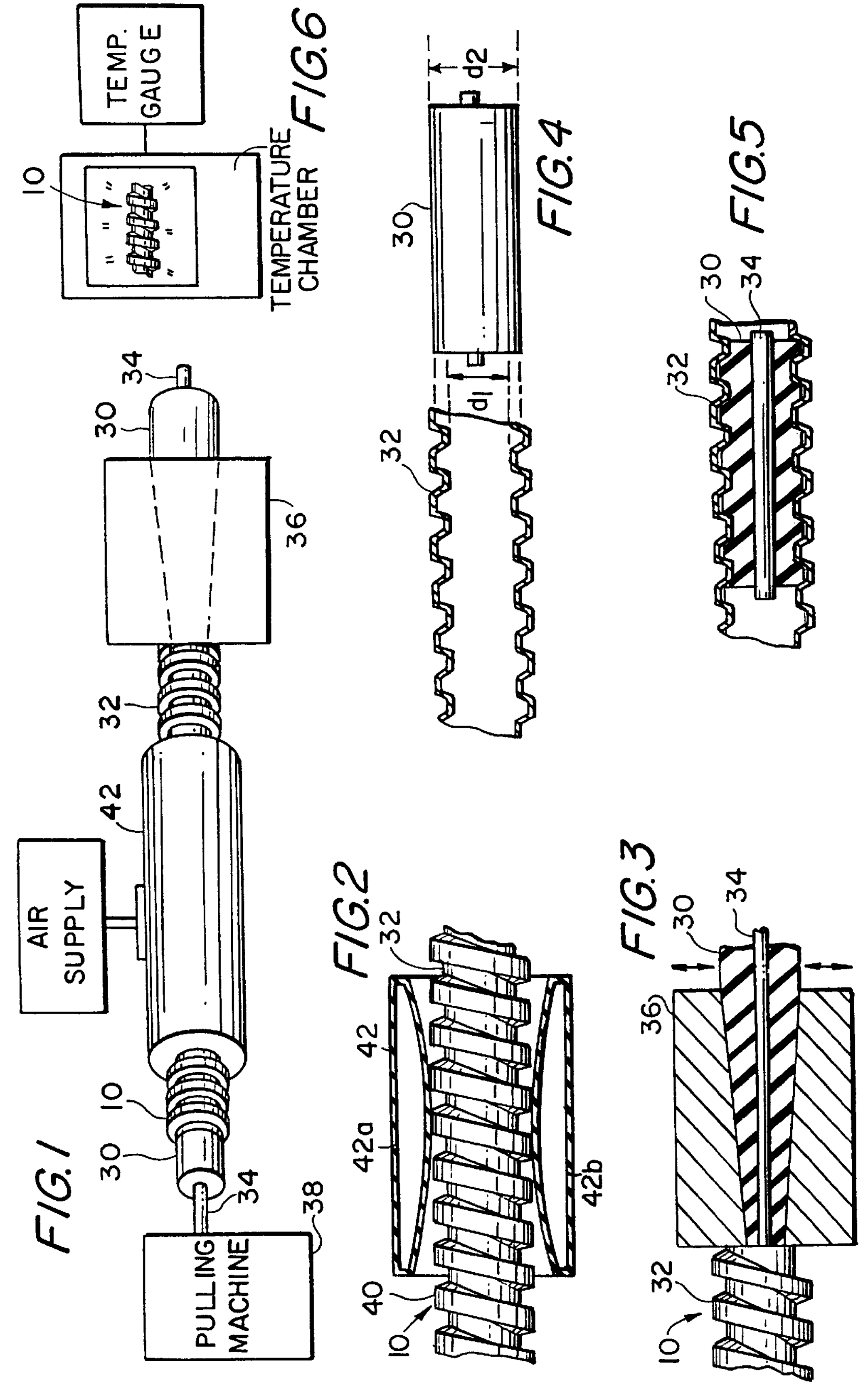
FIGS. 1–4 are diagrammatic illustrations of the preferred method for locking a resiliently compressible dielectric core to the convoluted outer conductor in accordance with the method of the present invention.
FIG. 5 is a cross-sectional view of a preferred embodiment of a flexible coaxial cable produced by the method of the present invention in which the compressible insertion step of FIGS. 1–3 has been employed, with the outer diameter of the core being larger than the inner diameter of the hollow sheath.
FIG. 6 is a diagrammatic illustration of the step of temperature cycling the flexible coaxial cable, locked in accordance with the method of FIGS. 1–5, between at least a pair of temperature extremes in accordance with the method of the present invention.

Referring now to the drawings in detail, and initially to FIGS. 1–4, the presently preferred method of the present invention is illustrated. A dielectric 30, such as one formed from wrapped expanded Teflon tape, or any other compressible dielectric such as, for example, PTFE foam, foam polyethylene, or foam Teflon, or a microporous material is preferably provided, with this core 30 preferably having a normal expanded outermost radial extent ($d_2$ in FIG. 4) which is larger than the inside diameter ($d_1$ in FIG. 4) of a hollow outer conductive sheath 32, such a preferably in the range of 1 to 4 mils (0.001–0.004) larger, depending upon the size of the outer conductor 32. As presently preferred, wrapped expanded Teflon tape is used as the dielectric 30 since it appears to give a lower loss and better phase versus temperature parameters than other known dielectrics with the best phase versus bending parameters appearing to occur when this dielectric 30 is wrapped larger than the inside diameter of the outer conductor 32 within the presently preferred 1 to 4 mil range and then compressed and pulled into the outer conductor 32 in accordance with the present invention. As shown and preferred in FIGS. 1–3, the dielectric core 30 comprises the dielectric 30 which surrounds an inner conductive member 34 such as the type of arrangement disclosed in applicant's prior U.S. Pat. Nos. 5,196,078; 5,239,134; 5,181,316; and 4,758,685, the contents of which are incorporated by reference herein, except for the difference in type of dielectric 30 and manner of attachment or locking of the core 30 to the outer conductor 32.

In this regard, in accordance with the present invention, the core 30 is resiliently compressible, i.e., has an elastic memory, and is compressed to a diameter less than the inside diameter $d_1$, by a conventional means such as a tapered die 36 as it is fed into and pulled through the inside of the hollow conductor 32 by a conventional pulling means 38, such as a motor, such as at a rate of approximately one foot per second, with a force of approximately 25 pounds for a small cable of approximately 0.210 diameter. The outer conductor 32 is the same type of convoluted conductor as disclosed in the above-mentioned patents. As shown and preferred in FIGS. 1–2, as the compressed dielectric core 30 is pulled through the convoluted outer conductor 32, the convolutions 40 of the convoluted outer conductor 32 are held or maintained in place so that there will be no elongation of the pitch when the compressed oversized dielectric core 30 is pulled through. This is preferably accomplished by a conventional air filled bladder 42, such as preferably two bladders **42*a*, 42*b* which are filled with air sufficiently to compress against the convolutions 40 of the outer conductor 32 and, thereby, hold the convolutions 40 in place against elongation. After the resiliently compressed oversized dielectric core 30 has been pulled through or fully inserted in the outer conductor 32 so that they are coextensive, the pulling is stopped, and the compressed core 30 expands back to its normal size diameter $d_2$, sturdily locking the expanded core 30 against the inner convolutions of the hollow conductor 32, such as illustrated in FIG. 5**.

It has been found that in applying this method, significant results are obtained for coaxial cables used in phase array radar systems and test equipment, such as, for example, obtaining a difference in phase versus bending around a 3 inch diameter mandrel which decreases from 3 degrees when the core 30 is not locked to less than 1.5 degrees at 26.56 GHz as well as decreasing the phase versus twisting from 4 degrees to 2 degrees at that frequency.

As shown and preferred in FIG. 6, and as discussed in applicant's prior U.S. Pat. Nos. 5,181,316 and 5,196,078, the locked coaxial cable 10 produced by the foregoing method, may then be temperature cycled, as disclosed in the above patents, in order to provide temperature stability for the coaxial cable 10.

What is claimed is:

1. A method of making a flexible coaxial cable comprising the steps of providing a resiliently compressible dielectric core for said cable, said resiliently compressible core comprising an inner conductive member and resiliently compressible dielectric means surrounding said inner conductive member, said inner conductive member being located substantially along the longitudinal axis of said resiliently compressible dielectric means, said resiliently compressible dielectric means having a normal expanded outermost radial extent about said longitudinal axis providing a flexible hollow outer conductive sheath of substantially the same extent as said dielectric core, said sheath having a longitudinal axis coextensive with said dielectric core longitudinal axis and in innermost radial extent about said longitudinal axis which defines the innermost circumference of said hollow within said sheath, said dielectric core normal expanded outermost radial extent being larger than said sheath innermost radial extent, said sheath comprising a corrugated portion having a plurality of peaks and valleys of predetermined pitch and a conductive portion disposed about said peaks and having a pitch equivalent to said predetermined pitch, said conductive portion pitch having a defined elongation, said conductive portion being conductivity disposed on said peaks, said valleys defining said sheath innermost radial extent; compressibly inserting said resiliently compressible dielectric core into said hollow outer conductive sheath and drawing said compressible inserted dielectric core through said hollow outer conductive sheath while substantially maintaining said elongation of said conductive portion pitch until said sheath and said dielectric core are substantially coextensive for locking said compressible inserted dielectric core to said sheath as said resiliently compressible inserted core expands toward said normal expanded outermost radial extent for providing a locked flexible coaxial cable due to such compressible insertion.

2. A method in accordance with claim 1 wherein said dielectric core comprises wrapped expanded Teflon tape.

3. A method in accordance with claim 1 wherein said dielectric core comprises PTFE foam.

4. A method in accordance with claim 1 wherein said dielectric core comprises foam polyethylene.

5. A method in accordance with claim 1 wherein said dielectric core comprises foam Teflon.

6. A method in accordance with claim 1 wherein said dielectric core comprises a resiliently compressible microporous material.

7. A method in accordance with claim 1 wherein said step of compressibly inserting said core into said sheath comprises the step of compressibly inserting said core into said sheath through a tapered die means.

8. A method in accordance with claim 7 wherein said step of compressibly inserting said core into said sheath and drawing said compressibly inserted core through said sheath further comprises the step of holding said outer conductive sheath corrugated portion in place by air pressure as said dielectric core is drawn through said sheath.

9. A method in accordance with claim 8 wherein said step of holding said outer conductive sheath corrugated portion in place by air pressure further comprises the steps of surrounding said outer sheath with an air bladder means and sufficiently filling said air bladder means with air for compressing said air bladder means against said corrugated portion with a locking force as said compressibly inserted core is drawn through such sheath.

10. A method in accordance with claim 9 wherein said core comprises wrapped expanded Teflon tape.

11. A method in accordance with claim 8 wherein said core comprises wrapped expanded Teflon tape.

12. A method in accordance with claim 1 wherein said normal expanded outermost radial extent is substantially in the range of 1 to 4 mils larger than said sheath innermost radial extent.

* * * * *